US012644012B2

(12) United States Patent
Schubert et al.

(10) Patent No.: US 12,644,012 B2
(45) Date of Patent: Jun. 2, 2026

(54) COATING COMPOSITIONS INCLUDING WATERBORNE ALKYD RESINS AND METAL CATALYSTS

(71) Applicant: SWIMC LLC, Cleveland, OH (US)

(72) Inventors: Mark Schubert, Cleveland, OH (US); Leo Lazaruk, Cleveland, OH (US)

(73) Assignee: SWIMC LLC

( * ) Notice: Subject to any disclaimer, the term of this patent is extended or adjusted under 35 U.S.C. 154(b) by 620 days.

(21) Appl. No.: 18/004,215

(22) PCT Filed: Jul. 6, 2021

(86) PCT No.: PCT/US2021/040456
§ 371 (c)(1),
(2) Date: Jan. 4, 2023

(87) PCT Pub. No.: WO2022/010857
PCT Pub. Date: Jan. 13, 2022

(65) Prior Publication Data
US 2024/0010866 A1     Jan. 11, 2024

Related U.S. Application Data

(60) Provisional application No. 62/705,612, filed on Jul. 7, 2020.

(51) Int. Cl.
| | |
|---|---|
| *C09D 175/04* | (2006.01) |
| *C08K 5/56* | (2006.01) |
| *C09D 7/41* | (2018.01) |
| *C09D 7/61* | (2018.01) |
| *C09D 7/63* | (2018.01) |
| *C08K 3/22* | (2006.01) |

(52) U.S. Cl.
CPC .............. *C09D 175/04* (2013.01); *C08K 5/56* (2013.01); *C09D 7/41* (2018.01); *C09D 7/61* (2018.01); *C09D 7/63* (2018.01); *C08K 2003/2241* (2013.01)

(58) Field of Classification Search
CPC .......... C09D 175/04; C09D 7/41; C09D 7/61; C09D 7/63; C09D 133/00; C09D 167/08; C09D 175/06; C09D 7/43; C08K 5/56; C08K 2003/2241; C08K 3/011; C08K 3/10; C08K 5/0025; C08K 5/0091
See application file for complete search history.

(56) References Cited

U.S. PATENT DOCUMENTS

| | | | |
|---|---|---|---|
| 4,170,486 A | * | 10/1979 | Doppler .................... C09C 1/56 |
| | | | 524/398 |
| 4,311,625 A | | 1/1982 | Bellettiere et al. |
| 2012/0010344 A1 | | 1/2012 | Weijnen et al. |
| 2013/0274386 A1 | | 10/2013 | Weijnen et al. |
| 2019/0309185 A1 | | 10/2019 | Temel et al. |

FOREIGN PATENT DOCUMENTS

| | | | | |
|---|---|---|---|---|
| CN | 107880749 A | * | 4/2018 | ........... C09D 167/08 |
| CN | 111344325 A | | 6/2020 | |
| EP | 0253164 A1 | * | 1/1988 | ............. C08L 97/02 |
| GB | 2060661 A | * | 5/1981 | ........... C08F 299/06 |
| JP | 2004238524 A | | 8/2004 | |
| JP | 2017105905 A | | 6/2017 | |
| KR | 20160088215 A | * | 7/2016 | ........... C09D 167/02 |
| WO | 2019094664 A1 | | 5/2019 | |

OTHER PUBLICATIONS

Machine English translation of Huang, Zhi-Qiang, CN-107880749-A, Apr. 6, 2018. (Year: 2018).*
Machine English translation of Klein Werner, EP-0253164-A1, Jan. 20, 1988. (Year: 1998).*
Machine English translation of Xu Qiang, KR-20160088215-A, Jul. 25, 2016. (Year: 2016).*
PCT International Search Report for PCT/US2021/040456 dated Oct. 19, 2021.
PCT Written Opinion of the International Search Authority for PCT/US2021/040456 dated Oct. 19, 2021.
European Patent Office, Extended European Search Report for Application No. 21838658.9 dated Oct. 11, 2024.

* cited by examiner

*Primary Examiner* — Coris Fung
*Assistant Examiner* — Caroline D. Liott
(74) *Attorney, Agent, or Firm* — Honigman LLP

(57) ABSTRACT

Disclosed is a coating composition that generally includes a waterborne alkyd resin and a siccative containing a primary drier in amounts greater than manufacturer-recommended amounts, a methods for applying and preparing such a coating composition. Additional resins and other conventional coatings additives can be formulated into such a coating. Such a coating can yield a cured coating that has a higher pendulum hardness and block resistance than that of a coating formed from an otherwise identical composition that includes manufacturer-recommended levels of primary drier with comparable gloss characteristics.

16 Claims, No Drawings

COATING COMPOSITIONS INCLUDING WATERBORNE ALKYD RESINS AND METAL CATALYSTS

TECHNICAL FIELD

The present disclosure generally pertains to coating compositions. In various non-exclusive embodiments, the disclosure is directed to a coating composition that has improved properties such as improved initial hardness and block resistance or improved ultimate hardness, a method of preparing a coating composition, a method of applying a coating composition, and a cured coating.

BACKGROUND

Coating compositions are typically used to coat doors, windows, cabinets, and trim, especially such trim surfaces as baseboards, door jambs, crown molding, window casings, and chair rail. Generally, consumers prefer that a trim coating possess several aesthetic and functional properties. For example, a trim coating having scratch resistance and high hardness can be resistant to damage caused by impact or abrasion and require less frequent repainting. In addition, high labor costs can be associated with painting trim that has already been installed in a building, due to the necessity of masking-off areas surrounding the trim. It is therefore desirable to pre-coat trim pieces before installation. In some instances where trim is pre-coated before installation, however, the applied coating can be damaged during installation. This again requires a coating composition that has high hardness and scratch resistance.

In addition, block resistance is another desirable property of coating compositions, especially for surfaces such as doors, door jambs, windows and window casings. In addition, it may be preferable for coatings to have block resistance when applied to uninstalled trim, so that separate pieces of the trim do not stick together during transport or storage.

It is also highly desirable to provide a coating composition that cures to form a coating having high hardness, scratch resistance, and block resistance soon after application of the coating. For instance, if a coating composition cures quickly to provide these properties, a freshly painted area in a building can return to normal use soon after painting. It is desirable to provide a coating composition that exhibits these desirable properties.

In waterborne, alkyd-based coatings, which may include paints that comprise a waterborne alkyd resin in combination with another type of resin or resins, it is believed that curing occurs when the coating composition is exposed to oxygen in ambient air, which reacts with the alkyd resin to cause oxidative crosslinking. Catalysts known as primary driers are conventionally believed to accelerate curing of the outer surface of waterborne, alkyd-based coatings to provide accelerated curing and thus hardness and block resistance during an initial cure period. Conventionally, it is believed, however, that adding too much primary drier can cause "skinning" which inhibits "through drying" or curing underneath the outer layer of cured, waterborne alkyd-based coatings. In the relevant art, it is believed that inhibited through drying and other effects associated with perceived over-use of primary driers will result in unacceptably reduced full-cure hardness and defects in cured coating appearance like reduced gloss, independent of the use of other driers like through or auxiliary driers. Manufacturers supplying primary driers accordingly provide strong recommendations to use particular ranges of amounts of primary drier in coatings.

SUMMARY

Coating compositions comprising a waterborne alkyd binder resin and a siccative. The coating compositions may optionally contain other binder resins present in any suitable amounts relative to one another, including a urethane alkyd, vinyl resins, vinyl acrylic resins, all acrylic resins, polyurethane dispersion resins, styrene resins, and styrene acrylic resins. The coating compositions are preferably aqueous (water-based) compositions. Pigments, fillers, extenders, biocides, surfactants, dispersants, and other conventional coatings additives may also be formulated in the coatings compositions.

The siccative comprises a primary drier. In certain embodiments, the siccative further may include through or auxiliary driers. In certain embodiments, the primary drier is selected from the group consisting of iron-based driers, cobalt-based driers, manganese-based driers, vanadium-based driers, and mixtures thereof. In embodiments, the primary drier is provided in the coating compositions in amounts greater than conventional recommendations by the drier and resin manufacturers. In certain embodiments, the primary drier can be provided from 1.1 to 10 times the drier manufacturer-recommended amount by weight as a weight percentage of resin solids, in other embodiments 1.1 to 9 times, in other embodiments 1.1 to 7 times, in other embodiments 1.1 to 5 times, in other embodiments 2.0 to 10 times, in other embodiments, 2.0 to 7 times, in other embodiments, 2.4 to 7 times, in other embodiments, 2.4 to 5 times, in other embodiments, 2.4 to 4.8 times, and in still other embodiments 1.1 to 4.8 times the drier manufacturer-recommended amount.

In certain embodiments, the primary drier is an iron-based drier catalyst and the catalyst is present in an amount of 2.4 to 20, 2.4 to 9.6, 4.8 to 9.6, or 4.8 to 20 weight drier catalyst on a weight resin solids basis.

In certain embodiments, the primary drier is an iron-based drier catalyst and the drier catalyst is present such that the iron metal is present in 0.216 to 1.800, 0.216 to 0.432 to 0.864, or 0.432 to 1.800 percent iron on a weight resin solids basis.

In certain embodiments, the primary drier is a cobalt-based drier catalyst and the drier catalyst is present such that the cobalt metal is present in 0.096 to 0.8, 0.096 to 0.19 to 0.38, or 0.19 to 0.8 percent cobalt on a weight resin solids basis.

Coating compositions comprising a waterborne alkyd-based resin and siccative including a primary drier in the disclosed amounts surprisingly provide cured coatings that have higher pendulum hardnesses and block resistances over initial curing periods (defined herein as one day cure time) than that of an otherwise-identical composition prepared with conventional amounts of primary drier. Additionally, the disclosed coating compositions surprisingly reach higher levels of ultimate hardness (hardness that develops at longer time periods than the initial cure period, such as after one week of drying) while retaining gloss characteristics as compared to conventional coatings that are substantially similar but contain less primary drier.

A method for preparing a coating composition can comprise blending a waterborne alkyd resin and a siccative including a primary drier. In some embodiments, a method of applying a coating composition comprises applying the coating composition to a substrate and allowing the coating composition to cure. The coating composition is deemed to be particularly suitable for interior trim surfaces, but may have other applications including applications to wood or other substrates.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a system or method that includes "a" siccative means that the system or method may include "one or more" siccatives.

The terms "architectural paints" and "architectural stains" respectively mean paints and stains for use on interior or exterior building or construction surfaces, e.g., walls, trim, floors, decks, railings, ceilings, roofs (including metal roofing, shingles and tiles), roadways, sidewalks, etc.

The term "base paint or stain" means a water-borne or solvent-borne paint or stain product packaged in a largely but incompletely filled point-of-sale container with a volume of about 0.2 to 20 L equipped with an openable and recloseable lid, cap or other closure, and which may be used as is but normally will be tinted at the point-of-sale by adding one or more colorants to the paint or stain product in its container, and stirring, shaking or otherwise mixing the container contents to disperse the colorant throughout the base paint or stain product.

The term "binder" means a film-forming natural or synthetic polymer or resin or drying oil suitable for use in a paint or stain.

The term "colorant" means a composition that can be added to (e.g., dispensed into) a point-of sale container whose interior volume is largely (e.g., two thirds of the container volume or more) but not completely already filled with a base paint or stain so as to alter the hue or lightness of such base paint or stain, and which contains pigment or dye, a surface treatment (e.g., a surfactant or dissolution aid) and an optional vehicle but is substantially free of binder.

The term "custom-tinted" when used with respect to a system or method for tinting base paints or stains means that one or more colorants can be dispensed into a base paint or stain and mixed to provide finished paint or stains in a wide variety of (e.g., more than one hundred or even more than one thousand) preselected formulated colors or, if desired, a match for randomly-selected colors. The preselected formulated colors will ordinarily be viewed by potential end users using printed color charts or displayed computer images.

The term "NVM" is an abbreviation for non-volatile materials, and refers to a material that does not significantly evaporate at standard temperature and pressure. NVM content may be evaluated using ASTM D1353-13. "NVV" may also be used to refer to non-volatile volume, an analogous measure with respect to volume of coating components.

The term "paint" means a coating composition including pigment and binder which when applied to form a thin (e.g., 100 μm) wet thickness coating film on a freshly-sanded smooth wood surface, will when dried hide or substantially hide the wood grain and will present a new surface with its own appearance.

The term "pigment" includes both colored, dispersible solid particulate materials and colored dispersible or soluble dye materials, wherein the material imparts visually noticeable color to a base paint or stain when 5 wt. % (in the case of a colored, dispersible solid particulate) or 0.05 wt. % (in the case of a colored, dispersible or soluble dye) of the material is added to (e.g., dispensed into) the base paint or stain. The presence or absence of visually noticeable color may be assessed by preparing drawdown samples of the base paint or stain with and without the pigment, casting such samples as 25 μm dry thickness coated films over the white part of a BYK-Gardner No. PA-2811 opacity drawdown chart (from BYK-Gardner USA) or comparable chart, and examining the coated films under normal overhead interior illumination.

The term "pigment volume concentration" (or "PVC") when used in respect to a paint, stain or colorant means the total percentage of dried coating volume occupied by all pigment species in the coating. PVC may be determined for a given coating formulation according to a standard formula knowing the composition of the non-volatile fraction of the coating formulation.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "primarily or exclusively", when used with respect to the amount of ingredients in a coating composition, means in the case of the word "primarily" that the named ingredient or ingredients represent at least 50 wt. % of the ingredients in such coating composition, excluding any solvent or other carrier (e.g., water) that may be present in the coating composition. In some embodiments the named ingredient or ingredients may represent at least 60 wt. %, at least 70 wt. %, at least 80 wt. % or at least wt. % of the ingredients in such coating composition, excluding such solvent or other carrier. In the case of the word "exclusively", the coating composition consists essentially of or consists of such named ingredients, excluding such solvent or other carrier.

The term "resin solids" when used as a basis for drier or drier catalyst metal amount, refers to the weight of dry solid materials in all binder resins in a coating's formulation, including the waterborne alkyd-based resin.

The term "siccative" means an additive dispersible within an air-oxidizable solvent-borne or water-borne base paint or stain that accelerates the curing time of alkyd materials contained within the base paint or stain. Without being bound by theory, such siccatives are believed to accelerate such curing time by catalyzing the free-radical autoxidation of conjugated double bonds contained therein when exposed to air. Siccatives comprise primary driers and may further comprise auxiliary driers, through driers, and combinations thereof.

The term "siccative-free" when used in the context of a siccative-free base paint or stain means a representative component formulated without including a siccative. In some embodiments, a siccative-free composition may be the same as a composition that is substantially free of siccative materials.

The term "solid" when used to describe a material that can exist in several different phases refers to the phase occupied by that material at room temperature (23° C.) and 1 atm.

The term "solvent-borne" when used in respect to a paint, stain or colorant means that the major liquid vehicle or carrier for the paint, stain or colorant is a nonaqueous solvent or mixture of nonaqueous solvents.

The term "stain" means a coating composition including binder which when applied to form a thin (e.g., 100 μm) wet thickness coating film on a freshly-sanded smooth wood surface, will when dried not hide both the wood grain and its texture. When a semi-transparent stain is applied to wood, the wood grain and its texture normally both remain noticeable, whereas when a solid color (viz., opaque) stain is applied the grain normally becomes hidden while the texture normally remains noticeable. A stain typically will soak into a wood or other porous substrate (e.g., concrete) to a much greater extent than will a paint.

The term "substantially free of" when used with respect to an ingredient or composition means that the referenced ingredient or composition contains less than 0.1 wt. % of the recited component. The term "completely free" of a particular compound means that the recited material or composition contains less than 100 parts per million (ppm) of the compound.

The terms "tint strength" and "tinting strength" refer to the value obtained using spectrophotometric instrumentation such as, but not limited to, a Datacolor DC500, DC800 or similar spectrophotometer, a D65 illuminant, CIE 196410° Standard Observer angle and reflectance mode.

The term "water-borne" or "waterborne" when used in respect to a paint, stain or colorant means that the major liquid vehicle or carrier for the paint, stain or colorant is water.

The recitation of a numerical range using endpoints includes all numbers subsumed within that range (e.g., 1 to 5 includes 1, 1.5, 2, 2.75, 3, 3.80, 4, 5, etc.).

The disclosed coating compositions generally comprise a waterborne alkyd binder resin and a siccative. The coating compositions may optionally contain other binder resins present in any suitable amounts relative to one another, including a urethane alkyd, vinyl resins, vinyl acrylic resins, all acrylic resins, polyurethane dispersion resins. The coating compositions are preferably an aqueous (water-based) compositions. Pigments, fillers, extenders, biocides, surfactants, dispersants, and other conventional coatings additives may also be formulated in the coatings compositions as described in greater detail, below.

Resins

Any suitable waterborne alkyd resin may be employed, including for instance long-oil alkyds, medium-oil alkyds, short-oil alkyds, or modified alkyds (e.g., a urethane alkyd). Exemplary processes for making an alkyd resin include condensation of alcohols and any one or more of acids and anhydrides. Exemplary alcohols include polyhydric alcohols such as ethylene glycol, diethylene glycol, dipentaerythritol, dipropylene glycol, glycerol, neopentyl glycol, pentaerythritol, polyethylene glycol, polypropylene glycol, sorbitol, triethylene glycol, trimethylol ethane, trimethyol propane, 1,2-butanediol, 1,2-propanediol, 1,3-butanediol, 1,3-propanediol, 1,4-butanediol, 1,6-hexanediol, 2-butyl-2-ethyl-1,3-propanediol, 3-methyl-1,5-pentanediol, etc. Exemplary acids include polycarboxylic acids and fatty acids. Suitable polycarboxylic acids include adipic acid, azelaic acid, citric acid, cyclohexane dicarboxylic acid, dodecane dioic acid, fumaric acid, glutaric acid, isophthalic acid, itaconic acid, maleic acid, nadic acid, phthalic acid, pyromellitic acid, sebacic acid, succinic acid, terephthalic acid, tetrahydrophthalic acid, trimellitic acid, etc. Useful fatty acids include non-drying, semi-drying, and drying fatty acids. Fatty acids may be derived from natural or synthetic materials, and may be saturated or unsaturated. Exemplary fatty acids include those derived from oils such as calendula oil, castor oil, coconut oil, corn oil, cottonseed oil, herring oil, linseed oil, mustard seed oil, olive oil, palm oil, peanut oil, rapeseed oil, safflower oil, sesame oil, soybean oil, sunflower oil, tall oil, tallow oil, tung oil, veronia oil, etc. Suitable anhydrides include adipic anhydride, azelaic anhydride, phthalic anhydride, isophthalic anhydride, maleic anhydride, terephthalic anhydride, itaconic anhydride, nadic anhydride, pyromellitic dianhydride, succinic anhydride, sebacic anhydride, tetrahydrophthalic anhydride, trimellitic anhydride, 1,2,4,5-cyclohexanetetracarboxylic dianhydride, etc. An exemplary alkyd resin comprises a residue of pentaerythritol and phthalic anhydride monomers.

An exemplary waterborne alkyd including urethane groups comprises a residue of isophorone diisocyanate. A commercially available waterborne urethane alkyd comprising a residue of isophorone diisocyanate is NeoPAC PU580 (sold by DSM). This resin is believed to be an alkyd/aliphatic polyurethane copolymer in water. The resin is understood to be essentially free of volatile amines, and to be formulated with one or more alkali metal hydroxides sufficient to cause the pH of the resin to be above about 7.1.

Optionally, any suitable additional resin may be employed, and such resin can be made using any known method of emulsion polymerization or otherwise. The monomers of such a suitable, additional resin can be polymerized in an aqueous medium in the presence of an emulsifying agent and an optional catalyst. Some exemplary, additional, suitable latex resins can comprise acrylic resins, vinyl-acrylic resins, styrene-acrylic resins, etc. Useful acrylic monomers include any compounds having acrylic structure, such as (meth)acrylates, alkyl(meth)acrylates, (meth)acrylic acids, acrylamide, acrylonitrile, etc. and aromatic derivatives thereof. Exemplary acrylic monomers include methyl(meth)acrylate, ethyl(meth)acrylate, butyl (meth)acrylate, propyl(meth)acrylate, 2-ethyl hexyl(meth) acrylate, cyclohexyl(meth)acrylate, decyl(meth)acrylate, isobutyl(meth)acrylate, isodecyl(meth)acrylate, benzyl (meth)acrylate, isobornyl(meth)acrylate, neopentyl(meth) acrylate, 1-adamantyl methacrylate, acrylic acids such as (meth)acrylic acid, ethacrylic acid, alpha-chloroacrylic acid, alpha-cyanoacrylic acid, protonic acid, beta-acryloxy propionic acid, beta-styryl acrylic acid; etc. Mixtures of the foregoing are contemplated. Exemplary aromatic monomers include any one or more of styrene, t-butyl styrene, chlorostyrene, methyl styrene, propyl styrene, vinyl napthalene, vinyl toluene, divinyl benzene, etc. The optional, additional suitable latex resin further can comprise any suitable phosphate-containing comonomer. Examples of phosphate-containing comonomers include bis(2-methacryloxyethyl) phosphate, monoacryloxyethyl phosphate, monolauryl (methacryloyloxy) phosphate, and so forth.

Optional, additional suitable resins can be crosslinkable and crosslinked by any suitable mechanism or chemical functionality. For example, optional, additional suitable resins that are latex resins comprise a residue of a monomer including a moiety capable of reacting with a crosslinker provided in an aqueous phase of the latexes. In an embodiment, a suitable, additional latex resin comprises polymers including a residue of acrylic monomers, diacetone acrylamide, and an aqueous phase comprising adipic dihydrazide as a crosslinker. Without intending to be bound by any particular theory, it is thought that ketone groups of the residue of diacetone acrylamide react with the hydrazide groups on the adipic dihydrazide in the crosslinking reaction.

Coating formulations according to the present disclosure can have as little as 10% waterborne alkyd content by weight binder resins and can be up to 100% waterborne alkyd by weight binder resins.

Siccatives

The coatings formulations disclosed herein contain one or more siccatives. Suitable siccatives that may be used in the disclosed system and methods include metal-organic compounds that catalyze hardening of the air oxidizable base paints and stains. In some embodiments, siccatives may include metal carboxylate driers such as organometallic salts derived from salts or coordination compounds of hydrocarbon carboxylates with metal ions. The metallic raw material and one or more organic acids may be dissolved in a diluent to produces the organometallic salt. Exemplary organic acids may be natural or synthetic. Natural organic acids may include, but are not limited to, naphthenates (e.g., petroleum based derivatives), fatty acids (e.g., unsaturated oleates), tallates, and the like. Synthetic organic acids may include, but are not limited to, 2-ethylhexanoate, neodecanoate, isononanoates, and the like. In some examples, siccatives may be characterized as oil-drying agents or Japan driers because they help reduce the drying or cure times of solvent-borne base paints or stains.

The siccative material includes one or more primary drier and may include one or more auxiliary or through drier materials. Primary driers function mainly by catalyzing the oxidative crosslinking of the resins, starting at the surface. If this crosslinked layer at the surface provides a barrier to diffusion of oxygen to the coating underneath, then skinning will occur leaving the coating underneath undercured. It is believed that through driers can help ensure that a coating dries at a uniform rate throughout the body of the film not just at the surface by, for example, linking fatty acid chains in the composition via oxygen-metal-oxygen bridges leading to crosslink connections in the coating, but the relevant art discloses that certain amounts of primary drier in excess of manufacturer-recommended amounts will result in adverse consequences independent of the use of through driers. Auxiliary driers are useful to modify the effects of other drier materials. For example, calcium-based auxiliary driers may be used in some circumstances to prevent unfavorable interactions between coatings additives and primary and through driers.

Examples of primary drier metals which can be used as the siccative material may include, but are not limited to, cobalt-, manganese-, iron-, and vanadium-based driers. Examples of through drier metals which can be used as part of the siccative material may include, but are not limited to, aluminum-, cerium-, lithium-, neodymium-, potassium-, strontium-, and zirconium-based driers. Examples of auxiliary drier metals which can be used as part of the siccative material may include, but are not limited to, calcium-, barium-, and zinc-based driers. In certain embodiments, siccative materials may include primary driers and no through or auxiliary driers.

In certain embodiments, the primary drier can be provided from 1.1 to 10 times the drier manufacturer-recommended amount by weight as a weight percentage of resin solids, in other embodiments 1.1 to 9 times, in other embodiments 1.1 to 7 times, in other embodiments 1.1 to 5 times, in other embodiments 2.0 to 10 times, in other embodiments, 2.0 to 7 times, in other embodiments, 2.4 to 7 times, in other embodiments, 2.4 to 5 times, in other embodiments, 2.4 to 4.8 times, and in still other embodiments 1.1 to 4.8 times the drier manufacturer-recommended amount.

In preferred examples, the siccative includes one or more iron-based primary driers. In preferred examples, the coatings formulation of the present disclosure includes an iron-based primary drier in an amount of 2.4 to 20, 2.4 to 9.6, 4.8 to 9.6, or 4.8 to 20 weight drier catalyst as a percent of resin solids. These ranges are above common manufacturer-recommended ranges. Surprisingly, initial cure hardness and block resistance in coatings containing the presently disclosed, elevated levels of iron-based drier catalyst are better than in coatings containing recommended amounts of iron-based drier catalyst. Also surprisingly, ultimate hardness (hardness measured after a longer curing period, e.g., seven days) is improved in coatings containing an iron-based drier in the presently disclosed amounts as compared to similar coatings with conventional amounts of iron catalyst. Additionally and further surprisingly, gloss after a longer curing period is retained as compared to conventional coatings. In certain alternative, preferred examples, the coatings formulation of the present disclosure includes an iron-based primary drier and the primary drier is present such that the iron metal is present in an amount of 0.216 to 1.800, 0.216 to 0.864, 0.432 to 0.864, or 0.432 to 1.800 percent iron metal on a weight resin solids basis. An exemplary iron drier catalyst is the iron-complex catalyst BORCHI® Oxy-Coat 1101 (sold by Borchers Americas, Inc., Westlake, OH).

In other preferred examples, the siccative may include one or more cobalt-based primary driers. In preferred examples, the coatings formulation of the present disclosure includes an cobalt-based primary drier and the primary drier is present such that the cobalt metal is present in an amount of 0.096 to 0.8, 0.096 to 0.38, 0.19 to 0.38, or 0.19 to 0.8 percent cobalt metal on a weight resin solids basis. Such preferred examples also yield surprising results over conventional coatings containing only manufacturer-recommended levels of primary drier. Initial cure hardness and block resistance are better with the disclosed, elevated levels of cobalt-based drier, ultimate hardness is better, and gloss is retained as compared to conventional coatings containing manufacturer-recommended amounts of primary drier. Exemplary cobalt driers include 5% Cobalt Hydro-Cure® II (sold by Borchers Americas, Inc., Westlake, OH) and Duroc to DB 314 (available from DURA Chemicals, Inc., Emeryville, CA).

In further preferred examples, the siccative may include both of one or more cobalt- and one or more iron-based primary driers.

Siccatives may also be selected to exhibit reduced color properties such that the inclusion of the siccative does not alter the color performance of base paint or stain or the added colorant. Iron-based primary driers may be particularly preferred in a siccative for light colored paints or stains due to their compatible or less conspicuous color characteristics and robust drying characteristics. Other driers, such as cobalt-based driers may have a slightly colored (e.g., non-white) appearance in a siccative and may be better suited in darker colored paints or stains.

An exemplary, optional, through drier is and 12% Zirconium Hydro Cem (also sold by Borchers Americas, Inc., Westlake, OH).

Coatings Formulations

Generally, a coating composition can be formulated using the waterborne alkyd resin, siccative, and optional, additional, suitable resins. The coating composition also generally can comprise numerous other additives and components, as are conventional or as otherwise may be found suitable in a coating composition. Exemplary additives include any one or more of neutralizing agents, antifoaming agents, fillers, dyes, dispersants, surfactants, extenders, adhesion promoters, wetting agents, rheology modifiers, leveling agents, deflocculants, anti-blocking agents, antimicrobials such as mildewcides, fungicides, algaecides, and bactericides, other preservatives, thickeners, thixotropic agents, drying agents, anti-settling agents, rust inhibitors, and flattening agents. When used, such additives may be present in any amounts suitable for their intended purposes. It is contemplated that some additives will play multiple roles in a coating composition. One suitable preservative is PROXEL BD20, sold by Arch Chemicals, Inc., Norwalk, CT.

Any suitable rheology modifier may be incorporated into a coating composition. Exemplary polyurethane rheology modifiers include nonionic, solvent-free, hydrophobically modified ethylene oxide urethane (HEUR) rheology modifiers such as ACRYSOL™ RM-2020 NPR (sold by the Dow Chemical Company) and nonionic urethane rheology modifiers such as ACRYSOL™ RM-12W and ACRYSOL™ RM-8W (sold by the Dow Chemical Company).

The coating composition can include any suitable surfactant. In some embodiments, a phosphate surfactant can be included in a crosslinking acrylic latex resin of the coating composition. Exemplary phosphate surfactants include phosphate esters such as methyl phosphate, 2-ethylhexyl phosphate, decyl alcohol ethoxylated phosphate esters, lauryl alcohol ethoxylated phosphate esters, n-octyl phosphate, nonylphenol ethoxylated phosphate esters, octyl phenol ethoxylated phosphate esters, styrenated phenol ethoxylated phosphate esters, tridecyl alcohol ethoxylated phosphate esters, etc. An exemplary phosphate ester surfactant is DEXTROL™ OC-50 (sold by Ashland Global Specialty Chemicals, Inc., Wilmington, DE). Other useful surfactants comprise TRITON™ CF-10 (sold by the Dow Chemical Company), E-SPERSE® RX 201, E-SPERSE® RX 202, and E-SPERSE® RX 203 (sold by Ethox Chemicals, Greenville, SC).

Any suitable dispersant, such as any one or more of anionic dispersants, cationic dispersants, amphoteric dispersants, or nonionic dispersants may be used in the coating composition. Exemplary dispersants include 2-amino-2-methyl-1-propanol (e.g., sold as AMP™ by Angus Chemical Company), DISPERBYK®-190 (sold by Byk of Altana Group), pyrophosphates such as tetrapotassium pyrophosphate and tetrasodium pyrophosphate, tripolyphosphates such as potassium tripolyphosphate and sodium tripolyphosphate, NUOSPERSE® FA 196 (sold by Elementis Specialties), etc. Any suitable wetting agents such as any one or more of anionic wetting agents, cationic wetting agents, amphoteric wetting agents, or nonionic wetting agents may be used. Any suitable deflocculant, such as sodium potassium tripolyphosphate, can be used.

The coating composition may include any suitable humectant or other component suitable to improve the open time of the composition. Exemplary open time extenders include glycols such as ethylene glycol and propylene glycol. When used, the open time extenders can be used in any suitable amounts. For example, ethylene and propylene glycol may be used in amounts of at least 5 g/L, and preferably are used in amounts ranging from 40 to less than 50 g/L. Generally, the glycols may be used in amounts sufficient to improve the open time of the composition but such that the composition has a volatile organic compounds (VOC) content of less than 50 g/L as determined by ASTM D6886. The ASTM test is believed to operate within a margin of error of about ±6 g/L; in practice, a composition that yields a result of less than about 56 g/L under this test will be deemed to be a composition that has a VOC content of less than 50 g/L. In some embodiments, the coating composition is essentially free of VOCs except for the ethylene or propylene glycol or other open time extenders.

The coating composition may, if desired, include one or more fillers or extenders. Exemplary fillers include, for example, sodium-potassium alumina silicates such as MINEX® 4 and MINEX® 10 (sold by Unimin Corporation, New Canaan, CT). When used, such fillers may be employed in any desired amount.

Useful antimicrobial additives include phosphates, zeolites, hydroxyapatites, organic acids, phenols, alcohols, quaternary ammonium compounds, additives containing metal ions such as ions of silver, zinc, and copper, etc. An exemplary antimicrobial additive is Zinc Omadine™ ZOE™ dispersion (sold by Lonza Group AG).

One or more types of pigment may be included in a coating composition via any suitable technique, such as by adding raw pigment or a pigment vehicle during manufacture of the composition or by instilling a pigment at the point of sale. Exemplary pigments include azo pigments, anazurite, aluminum silicate, aluminum potassium silicate, aluminum paste, anthraquinone pigments, antimony oxide, barium metaborate, barium sulfate, cadmium sulfide, cadmium selenide, calcium carbonate, calcium metaborate, calcium metasilicate, carbon black, chromium oxides, clay, copper oxides, copper oxychloride, dioxazine pigments, feldspar, hansa yellows azo pigments (some of which are listed above), benzimidazolones, iron oxides such as yellow and red iron oxides, isoindoline pigments, kaolinite, lithopone, magnesium silicates, metallic flakes, mica, napthol pigments such as napthol reds, nitroso pigments, nepheline syenite, perinone pigments, perylene pigments, polycyclic pigments, pyrropyrrol pigments, pthalocyanines such as copper pthalocyanine blue and copper pthalocyanine green, quinacridones such as quinacridone violets, quinophthalone pigments, silicates, sulfides, talc, titanium dioxide, ultramarine, zinc chromate, zinc oxide, and zinc phosphate. In addition, pearlescents, optical brighteners, ultraviolet stabilizers, and the like may be added to a coating composition. Titanium dioxide is a preferred pigment/whitening agent.

Coating compositions may contain varying amounts of pigment with varying gloss or sheen values. In certain embodiments, the PVC values of the coatings of the present disclosure range from 0 to 90, 10 to 80, 10 to 50, 40 to 90, 20 to 60, and 30 to 80. In certain embodiments, the coating compositions of the present disclosure may be deep bases or ultra deep bases. In certain embodiments, coating compositions of the present disclosure may be so-called "clear coat" compositions for application to wood or other substrates, the compositions containing no or very little pigment.

Upon applying the coating composition to a substrate, the composition will cure to form a cured coating, the cured coating comprising a cross-linked product of a coating composition. The cured coating preferably exhibits any one or more of high block resistance and high hardness after an initial curing period. Exemplary initial curing periods span a period of one day (24 hours) from the time of application of a coating composition. The cured coating preferably exhibits one or more of high ultimate hardness and minimal down-glossing as compared to conventional coatings containing manufacturer-recommended amounts of primary drier. Ultimate hardness typically occurs after a longer curing period that the initial curing period. Exemplary longer curing periods range from six days to four weeks, six days to three weeks, seven days to two weeks, and seven days to two weeks. A seven-day period is an exemplary longer curing period.

The invention encompasses in some embodiments a method for preparing a coating composition. Generally, a method of making a coating composition can comprise combining and blending a waterborne alkyd resin and optional, additional, suitable resins to form a binder, thinning the binder through further addition of liquid and any other diluents, introducing a siccative, and introducing any suitable additives. Conventional manufacturing processes often involve four or more stages, these including pre-thin stage, a grind stage, a wash stage, and a thindown stage. In the pre-thin stage, one or binder resins may be mixed with a liquid within a thindown tank. Low-shear mixing may be applied in the thindown tank to form a pre-thin mixture. In the grind stage, pigments and other additives that will not homogenize under low-shear mixing may be dispersed into a carrier liquid under high shear conditions. The grind stage may be carried out in a high-shear mixing device, such as mill. The high shear applied in the grind stage breaks up agglomerates of particles and wet particles with a liquid. The composition of the liquid added when thinning the grind may be the same as or different from the composition of the carrier liquid used when preparing the grind. Next, in the wash stage, a wash liquid, which may have a composition that is the same as or different from the composition of the carrier liquid, may be pumped into the high-shear mixing device to move the grind paste into the thindown tank. Finally, in a thindown stage, the grind paste, the carrier liquid, the wash liquid, and the pre-thin mixture may be blended together in the thindown tank under low shear conditions. In this stage, the coating composition concentrate may be further let down through further addition of liquid, which may have the same composition as or a different composition from the carrier liquid. The method may employ these conventional stages, or the coating composition may be prepared by other suitable methods. For example, the method may employ continuous manufacturing using component slurries.

A siccative and one or more additives may be added at any suitable point during the manufacturing process, such as during the pre-thin stage, a grind stage, a wash stage, and a thindown stage. The siccative and the individual additives may be added at the same or a different times or points in the process. Individual components of the siccative (primary driers, through driers, etc.) may be added at the same or different times or points in the process.

Once prepared, the coating composition may be dispensed into a storage container, such as a paint can. The coating composition then may be transported and stored, such as in a warehouse or on a store shelf.

A method of applying a coating composition can comprise applying the coating composition to a substrate, and allowing the coating composition to cure. Once applied to the substrate, the coating composition will cure as the composition crosslinks. The curing process does not require additional equipment (e.g., a UV source), but rather, it is believed that the curing occurs when the coating composition is exposed to oxygen in ambient air, which reacts with the alkyd resin to cause oxidative crosslinking.

The coating composition may be employed for any suitable purpose. In some embodiments, the coating composition may be applied to interior or exterior architectural surfaces such as wood, drywall, cement, metal, and plaster, or over a primer coating. In certain embodiments, the coating composition may be applied to metals, composites, and other materials as a protective coating. In other embodiments, the coating composition may be applied to a surface to impart dry-erase characteristics. For example, the surface may be a wall, which may have paint or a primer already applied to the surface of the wall, over which the coating can be applied to form a dry-erase surface. The coating composition may be applied with brush, roller, sponge, or spray gun, or other conventional painting tool. The cured coating may have any suitable thickness, such as a thickness ranging from 0.05-2 mm with preferred thickness around 0.1 mm.

Test Methods

Block resistance of a coating can be measured by any suitable method. An exemplary method of block resistance measurement is described in ASTM D4946 "Standard Test Method for Blocking Resistance of Architectural Paints." In the present disclosure, block resistance measurements are made according to ASTM D4946 with slight variations on the method. Three-mil films are made in triplicate for each sample composition and cure time on sealed whited Leneta charts using a Bird Film Applicator and dried at 25° C. and 50% relative humidity for varying lengths of cure time: 1 and 7 days. Films are rated according to a modified scale as shown below:

TABLE 1

| Rating | Type of Separation |
| --- | --- |
| 5 | No tack |
| 4 | Slight tack |
| 3 | Tacky; no seal |
| 2 | 5 to 25% seal |
| 1 | 26 to 50% seal |
| 0 | 50 to 100% seal |

The reported block resistance rating is the sum of each rating for the triplicate sample sets (maximum rating of 15).

Hardness of a coating can be measured by any suitable method. An exemplary method of hardness measurement is pendulum (König) hardness. In the present disclosure, pendulum hardness is measured according to ASTM D-4366 "Standard Test Methods for Hardness of Organic coatings by Pendulum Damping Tests," except that hardness ratings are reported as number of pendulum swings rather than time. Pendulum hardness is evaluated by the number of swings of the pendulum contacting a coating applied to a chromated aluminum Q panel (sold by Q-LAB Corp., Westlake, OH). Samples were prepared at 5 mil wet film thickness in triplicate for each sample composition and cure time (cure times of 1 and 7 days). Pendulum hardness is ultimately reported herein as the average of each of the triplicate sample measurements. A greater number of swings indicates higher hardness.

20° gloss, 60° gloss, and 85° specular gloss of a coating can be measured by any suitable method. An exemplary method of measurement is by ASTM D523 "Standard Test Method for Specular Gloss". Measurements of the present disclosure were made according to ASTM D-523 on coatings applied by 4 mil Bird Film Applicator to sealed white Leneta charts and air dried in ambient laboratory conditions for 24 hours.

The following examples are provided to illustrate the present invention but should not be construed as limiting a scope of the invention.

EXAMPLES

Example Paints

For the following examples, coating compositions were prepared with the following ingredients with amounts listed in pounds.

TABLE 2

Paint Composition 1:

| Material Description | Parts Weight per 100 |
|---|---|
| NONIONIC SURFACTANT | 0.2529 |
| PROPYLENE GLYCOL HUMECTANT | 1.0114 |
| DUROCT DB 314 (Siccative containing primary drier) | 0.1011 |
| FLUOROSURFACTANT | 0.0361 |
| ANIONIC SURFACTANT | 0.1269 |
| BIOCIDE PACKAGE | 0.6166 |
| NUOSPERSE FX665 | 0.7637 |
| WORLEESOL E 150 W (40% Resin Solids) | 58.6222 |
| HEUR THICKENERS | 2.2014 |
| POLYSILOXANE DEFOAMER | 0.6141 |
| WATER | 16.1253 |
| FLASH RUST INHIBITOR | 0.1517 |
| AQUEOUS AMMONIA, 26 BE | 0.129 |
| BURGESS NO. 98 KAOLIN CLAY | 8.0502 |
| OPTIGEL WH | 0.2064 |
| MINEX 10 NEPHELINE SYENITE | 5.6764 |
| TITANIUM DIOXIDE, DRY | 5.3152 |

TABLE 3

Paint Composition 2:

| Material Description | Parts Weight per 100 |
|---|---|
| PROPRIETARY RESIN A - Urethane Modified Waterborne Alkyd (42% Resin Solids) | 66.0752 |
| POLYSILOXANE DEFOAMER | 0.3396 |
| WATER | 22.0001 |
| ATTAGEL CLAY 40 | 0.1132 |
| PROPYLENE GLYCOL HUMECTANT | 0.5094 |
| GLYCOL ETHER DPNB | 0.3396 |
| GEMINI SURFACTANT | 0.3396 |
| ETHOXYLATED ACETYLENIC SURFACTANT | 0.4121 |
| DISPERBYK-199 | 0.0362 |
| MINEX 10 NEPHELINE SYENITE | 3.6227 |
| BIOCIDE PACKAGE | 0.3478 |
| NONIONIC ASSOCIATIVE THICKENER | 3.6227 |
| HEUR THICKENER | 0.4076 |
| BORCHI OXY-COAT 1101 (primary drier) | 1.3585 |
| SLIP-AID ADDITIVE | 0.1698 |
| FLASH RUST INHIBITOR | 0.1698 |
| AQUEOUS AMMONIA, 26 BE | 0.1359 |

TABLE 4

Paint Composition 3:

| Material Description | Parts Weight per 100 |
|---|---|
| PROPYLENE GLYCOL HUMECTANT | 0.3199 |
| 12% ZR HYDRO-CEM (through drier) | 0.0914 |
| BORCHI OXY-COAT 1101 (primary drier) | 0.2742 |
| NONIONIC SURFACTANT | 0.3656 |
| ANIONIC SURFACTANT | 0.2742 |
| 2-AMINO-2-METHYL-1-PROPANOL 95 | 0.1371 |
| BIOCIDE PACKAGE | 0.8707 |
| MINERAL OIL DEFOAMER | 0.0229 |
| HEUR THICKENERS | 2.2395 |
| PROPRIETARY RESIN B - Urethane Modified | 48.4466 |

TABLE 4-continued

Paint Composition 3:

| Material Description | Parts Weight per 100 |
|---|---|
| Waterborne Alkyd (41% Resin Solids) | |
| POLYSILOXANE DEFOAMER | 0.2742 |
| DISPERBYK-190 | 0.457 |
| WATER | 16.811 |
| FLASH RUST INHIBITOR | 0.1371 |
| ATTAGEL CLAY 40 | 0.457 |
| MINEX 10 NEPHELINE SYENITE | 0.9141 |
| MINEX 4 - NEPHELINE SYENITE | 2.7423 |
| TITANIUM DIOXIDE, DRY | 25.1374 |

Additionally, Colorcast Ecotoner Blue Zero VOC (Color Corporation of America, Rockford, IL) was added to all formulations. The colorant was added to Paints 1 and 2 on a 12 fl. oz. per gallon (including the added colorant) basis. The colorant was added to Paint 3 on a 4 fl. oz. per gallon (including the added colorant) basis. The foregoing ingredients (including colorant) were blended to form Control Paints 1-3 for the compositions listed in each of Tables 1-3, respectively. Iron-based catalyst Borchi Oxy-coat 1101 and cobalt-containing catalyst 5% Cobalt Hydro-Cure® II were added to the respective Control Paint compositions to yield the additional, experimental example paints having iron-based or cobalt-based catalyst as described below in Tables 5 through 7. The amount of iron-based catalyst is expressed in terms of weight iron-based catalyst as a percentage of resin solids. The amount of cobalt-based catalyst is expressed as weight cobalt metal as a percentage of resin solids. The 5% Cobalt Hydro-Cure® II catalyst is 5% by weight cobalt metal. The Duroct DB 314 catalyst, which is present in the Control Paint 1 composition is 15% by weight cobalt metal. Resin solids as used herein refers to the solid content of all binder resins in a coating formulation.

TABLE 5

| Block Resistance | | |
|---|---|---|
| | 1-Day Cure | 7-Day Cure |
| Paint 1 | | |
| Control Paint 1 | 2 | 7 |
| Control Paint 1 + 0.19% Cobalt | 0 | 12 |
| Control Paint 1 + 0.38% Cobalt | 9 | 12 |
| Paint 2 | | |
| Control Paint 2 | 9 | 12 |
| Control Paint 2 + 4.8% Iron Catalyst | 12 | 12 |
| Control Paint 2 + 9.6% Iron Catalyst | 12 | 12 |
| Paint 3 | | |
| Control Paint 3 | 9 | 12 |
| Control Paint 3 + 4.8% Iron Catalyst | 9 | 12 |
| Control Paint 3 + 9.6% Iron Catalyst | 9 | 12 |

TABLE 6

| Pendulum Hardness | | |
|---|---|---|
| | 1-Day Cure | 7-Day Cure |
| Paint 1 | | |
| Control Paint 1 | 11 | 48.3 |
| Control Paint 1 + 0.19% Cobalt | 23.3 | 55.3 |
| Control Paint 1 + 0.38% Cobalt | 20.67 | 51.3 |

TABLE 6-continued

| Pendulum Hardness | | |
| --- | --- | --- |
| | 1-Day Cure | 7-Day Cure |
| Paint 2 | | |
| Control Paint 2 | 30 | 35.5 |
| Control Paint 2 + 4.8% Iron Catalyst | 31 | 42.5 |
| Control Paint 2 + 9.6% Iron Catalyst | 28.5 | 46.5 |
| Paint 3 | | |
| Control Paint 3 | 22 | 45 |
| Control Paint 3 + 4.8% Iron Catalyst | 20.3 | 50.67 |
| Control Paint 3 + 9.6% Iron Catalyst | 24.3 | 54 |

TABLE 7

| Gloss | | | | |
| --- | --- | --- | --- | --- |
| | Gloss Measurements | 20° | 60° | 85° |
| Paint 1 | Control Paint 1 | 16.2 | 54.3 | 84.9 |
| | Control Paint 1 + 0.19% Cobalt | 15.5 | 53.2 | 84.8 |
| | Control Paint 1 + 0.38% Cobalt | 12.5 | 48.5 | 83.8 |
| Paint 2 | Control Paint 2 | 14.8 | 49.2 | 79.5 |
| | Control Paint 2 + 4.8% Iron Catalyst | 15.2 | 49.7 | 79.5 |
| | Control Paint 2 + 9.6% Iron Catalyst | 14.5 | 47.8 | 76.6 |
| Paint 3 | Control Paint 3 | 13.3 | 50.6 | 75.4 |
| | Control Paint 3 + 4.8% Iron Catalyst | 12.9 | 50.2 | 75.6 |
| | Control Paint 3 + 9.6% Iron Catalyst | 12.7 | 50.1 | 75.7 |

It is thus seen that coating compositions can be provided with at least one of surprising hardness and block resistance after an initial cure period and surprising ultimate hardness, along with surprising gloss characteristics.

All methods described herein can be performed in any suitable order unless otherwise indicated herein or otherwise clearly contradicted by context. The use of any examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A coating composition comprising:
   a waterborne alkyd resin and one or more additional resins, wherein the one or more additional resins include acrylic, vinyl acrylic, or styrene acrylic resins; and a siccative, the siccative comprising a primary drier and optional, through or other driers;
   wherein the primary drier is an iron-based drier present in the coating composition such that the coating comprises 0.216 to 1.800 weight percent iron metal from the iron-based drier as a percentage of the coating resin solids; and
   wherein the major liquid carrier for the coating composition is water and wherein the coating composition has a VOC content of less than 50 g/L.

2. The coating composition according to claim 1, said alkyd resin comprising a residue of urethane groups, pentaerythritol, and phthalic anhydride monomers.

3. The coating composition according to claim 2, said urethane groups comprising a residue of isophorone diisocyanate.

4. The coating composition according to claim 1, further comprising a polyurethane rheology modifier.

5. The coating composition according to claim 1, further comprising titanium dioxide.

6. The coating composition according to claim 1, said coating composition including one or more glycols in an amount of at least 5 g/L.

7. The coating composition according to claim 1, wherein the coating further comprises pigment such that the coating composition is either a deep base or an ultradeep base coating.

8. The coating composition according to claim 1, said coating composition including one or more glycols, said coating composition being essentially free of VOCs other than said one or more glycols.

9. The coating composition according to claim 1, wherein said primary drier consists of an iron-based drier that is an organometallic salt dissolved in a diluent.

10. The coating composition according to claim 9, wherein the organometallic salt comprises a hydrocarbon carboxylate coordinated with iron metal.

11. The coating composition according to claim 10, wherein the hydrocarbon carboxylate comprises a natural organic acid or a synthetic organic acid.

12. The coating composition according to claim 1, wherein the coating, upon curing, displays increased pendulum hardness as measured according to ASTM D4366 after a 7-day cure period and a reduction in 20°, 60°, and 85° specular gloss as measured according to ASTM D-523 as compared to an otherwise identical composition prepared without the iron-based drier.

13. A method of applying a coating composition, the method comprising applying the coating composition of claim 1 to a substrate, and allowing the coating composition to cure.

14. The method according to claim 13, wherein the substrate is an interior or exterior architectural surface.

15. The method according to claim 14, wherein the coating, upon curing, displays increased pendulum hardness as measured according to ASTM D4366 after a 7-day cure period and a reduction in 20°, 60°, and 85° specular gloss as measured according to ASTM D-523 as compared to an otherwise identical composition prepared without the iron-based drier.

16. The method of applying a coating composition according to claim 13, said coating composition further including one or more glycols in an amount of at least 5 g/L.

* * * * *